United States Patent
Kim et al.

(10) Patent No.: US 8,741,476 B2
(45) Date of Patent: Jun. 3, 2014

(54) RECHARGEABLE BATTERY HAVING AN ELECTROLYTE INJECTION OPENING SEALING CAP

(75) Inventors: Sung-Bae Kim, Suwon-si (KR);
Yong-Sam Kim, Suwon-si (KR);
Dae-Won Han, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 695 days.

(21) Appl. No.: 12/645,259

(22) Filed: Dec. 22, 2009

(65) Prior Publication Data

US 2010/0159320 A1 Jun. 24, 2010

(30) Foreign Application Priority Data

Dec. 24, 2008 (KR) .................. 10-2008-0133807

(51) Int. Cl.
*H01M 2/08* (2006.01)

(52) U.S. Cl.
USPC ............................................. 429/185

(58) Field of Classification Search
USPC ..................... 429/122–347; 215/354–355
See application file for complete search history.

(56) References Cited

U.S. PATENT DOCUMENTS

| | | | |
|---|---|---|---|
| 6,447,949 B2 | 9/2002 | Iwata et al. | |
| 6,455,193 B1 | 9/2002 | Miyazaki et al. | |
| 7,241,529 B2 | 7/2007 | Cho | |
| 7,799,456 B2 | 9/2010 | Kim et al. | |
| 2008/0160393 A1* | 7/2008 | Kim et al. | 429/94 |

FOREIGN PATENT DOCUMENTS

| | | |
|---|---|---|
| CN | 1897346 A | 1/2007 |
| EP | 1 724 858 A1 | 11/2006 |
| EP | 1 753 051 A2 | 2/2007 |
| JP | 2000-090913 | 3/2000 |
| JP | 2000-268811 | 9/2000 |
| JP | 2002-289172 A | 10/2002 |
| JP | 2002-298832 | 10/2002 |
| JP | 2003-178748 | 6/2003 |
| JP | 2004-103579 | 4/2004 |
| JP | 2007-66600 | 3/2007 |
| JP | 2007-103286 | 4/2007 |
| JP | 2007-323860 | 12/2007 |

(Continued)

OTHER PUBLICATIONS

Machine Translation of JP 2007-323860 originally published on Dec. 2007 to Yamamoto et al.*

(Continued)

*Primary Examiner* — Jonathan G Leong
(74) *Attorney, Agent, or Firm* — Christie, Parker & Hale, LLP (57) ABSTRACT

A rechargeable battery includes an electrode assembly, a case housing the electrode assembly, an electrode terminal electrically connected to the electrode assembly and a cap plate sealing the case, the cap plate having an electrolyte injection opening. The electrolyte injection opening has a first opening having a first diameter and a second opening having a second diameter both defined by an inner wall of the cap plate, the second diameter being smaller than the first diameter, and a first guide portion between the first opening and the second opening. A sealing cap seals the electrolyte injection opening and includes a sealing member engaging the inner wall of the first opening and a fixing member coupled to the sealing member and engaging the inner wall of the second opening, wherein a portion of the fixing member is spaced from the inner wall of the second opening.

8 Claims, 8 Drawing Sheets

(56) References Cited

FOREIGN PATENT DOCUMENTS

| | | |
|---|---|---|
| JP | 2008-010264 | 1/2008 |
| JP | 2008-041548 | 2/2008 |
| JP | 2008-147069 | 6/2008 |
| KR | 1020070006091 A | 1/2007 |
| KR | 1020070096641 A | 10/2007 |
| KR | 10-2007-0115642 | 12/2007 |

OTHER PUBLICATIONS

Office action issued in corresponding Chinese application No. 200910258783.2, issued Feb. 22, 2012 including English Translation, 10pp.
European Search Report dated Mar. 9, 2010, for corresponding European application 09180095.3.
Patent Abstracts of Japan, and English translation of Japanese Publication 2007-066600, 7 pages.
Full English machine translation of JP 2002-289172 A, 11 pages.
Patent Abstracts of Japan, and English machine translation for Japanese Publication 2008-010264.
SIPO Office action dated Sep. 13, 2012, for corresponding Chinese Patent application 200910258783.2, with English translation, (13 pages).
SIPO Office action dated Mar. 15, 2013, for corresponding Chinese Patent application 200910258783.2, with English translation, (13 pages).
JPO Notice of Allowance dated Mar. 5, 2013, for corresponding Japanese Patent applcation 2009-280674, (2 pages).
Patent Abstracts of Japan, and English machine translation of Japanese Publication 2008-041548, (12 pages).
Patent Abstracts of Japan, and English machine translation of Japanese Publication 2008-147069, (7 pages).
SIPO Office action dated Jul. 8, 2013, for corresponding Chinese Patent application 200910258783.2, with English translation, (7 pages).

\* cited by examiner

RECHARGEABLE BATTERY HAVING AN ELECTROLYTE INJECTION OPENING SEALING CAP

CROSS-REFERENCE TO RELATED APPLICATION

This application claims priority to and the benefit of Korean Patent Application No. 10-2008-0133807 filed in the Korean Intellectual Property Office on Dec. 24, 2008, the entire content of which is incorporated herein by reference.

BACKGROUND OF THE INVENTION

1. Field of the Invention

The present invention relates to a rechargeable battery.

2. Description of the Related Art

A rechargeable battery can be recharged and discharged, unlike a primary battery that cannot be recharged. A low capacity rechargeable battery has been used for a portable small electronic device such as a mobile phone, a laptop computer, and a camcorder, and a large capacity rechargeable battery has been used for a hybrid vehicle to drive a motor.

A large capacity rechargeable battery includes a plurality of unit rechargeable batteries connected in series to generate necessary power. The plurality of unit batteries are integrally coupled for stability.

Each of the unit batteries may be formed in a cylindrical shape or a rectangular shape. A rectangular unit battery typically includes an electrode assembly having a positive electrode, a separator, and a negative electrode, a case for housing the electrode assembly, and a cap plate for closing and sealing the case.

The cap plate includes a terminal hole protruding externally from the cap plate, an electrode terminal electrically connected to the electrode assembly, an electrolyte injection opening formed to allow electrolyte solution to be injected into the case, the electrolyte injection opening being sealed with a sealing cap, and a discharge hole formed to discharge gas generated inside the case, the discharge hole closed and sealed with a vent plate.

The electrolyte injection opening enables injecting of the electrolyte solution after inserting the electrode assembly in the case and closing and sealing the case with the cap plate. The electrolyte injection opening is closed and sealed with the sealing cap through welding after injecting the electrolyte solution.

The electrolyte injection opening and the sealing cap are formed in a two-stage structure, such as with a cylindrical shape and a circular shape, respectively. Since the electrolyte injection opening and the sealing cap are respectively formed in the cylindrical shape and the circular shape, a wide interference area may be formed between the electrolyte injection opening and the sealing cap. Accordingly, the wide interference area makes designing an allowable tolerance difficult.

Since the electrolyte injection opening and the sealing cap are formed in the two-stage structure, such as a cylindrical shape and a circular shape, centers of the two stages of the electrolyte injection opening may not be aligned with centers of the two stages of the sealing cap. In this case, it is difficult to insert the sealing cap into the electrolyte injection opening, and productivity is deteriorated.

During a welding process, a pre-welding process is required to weld the sealing cap to the electrolyte injection opening in order to fix the sealing cap and prevent thermal distortion. Therefore, productivity is deteriorated. Welding quality is also deteriorated if the sealing cap is not smoothly fixed.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of the present invention provide a rechargeable battery enabling a sealing cap to be easily inserted into an electrolyte injection opening by reducing an interference area and preventing deformation of a sealing cap during welding by making a sealing cap solidly inserted in an electrolyte injection opening, simplifying a welding process by enabling one-time welding, and improving welding quality.

In one embodiment, a rechargeable battery includes an electrode assembly having a positive electrode, a separator, and a negative electrode; a case housing the electrode assembly; an electrode terminal electrically connected to the electrode assembly; a cap plate sealing the case, the cap plate having a terminal hole through which the electrode terminal protrudes and an electrolyte injection opening. The electrolyte injection opening has a first opening defined by an inner wall of the cap plate, the first opening having a first diameter; a second opening defined by an inner wall of the cap plate, the second opening having a second diameter smaller than the first diameter; and a first guide portion between the first opening and the second opening. The rechargeable battery also includes a sealing cap sealing the electrolyte injection opening, the sealing cap having a sealing member engaging the inner wall of the first opening; and a fixing member coupled to the sealing member and engaging the inner wall of the second opening, wherein a portion of the fixing member is spaced from the inner wall of the second opening.

In one embodiment, the first guide portion is a chamfered edge connecting the first opening and the second opening to guide insertion of the sealing cap in the electrolyte injection hole. Additionally, in another embodiment, the first opening and the second opening is cylindrical, the sealing member is a circular plate, and the fixing member is a polyhedron and has, for example, a quadrangular pillar shape, a triangular pillar shape, or a hexagonal pillar shape.

In one embodiment, a first edge of the fixing member contacts at least a portion of the inner wall of the second opening along a length of the first edge and a second edge of the fixing member opposite to the first edge is spaced from the inner wall of the second opening.

In one embodiment, an end portion of the fixing member has a chamfered edge for guiding the fixing member into the electrolyte injection opening. In another embodiment, the fixing member is a polyhedron and the sealing cap further includes a second guide member connected to the polyhedron and having a truncated polygonal pyramid shape, for example a truncated quadrangular pyramid shape, a truncated triangular pyramid shape, or a truncated hexagonal pyramid shape.

In one embodiment, a central longitudinal axis of the fixing member is not collinear with a central longitudinal axis of the second opening.

In another embodiment, a rechargeable battery includes an electrode assembly having a positive electrode, a separator, and a negative electrode; a case housing the electrode assembly; an electrode terminal electrically connected to the electrode assembly; a cap plate sealing the case, the cap plate having a terminal hole through which the electrode terminal protrudes and an electrolyte injection opening. The electrolyte injection opening has a first opening defined by an inner wall of the cap plate, the first opening having a first diameter; a second opening defined by an inner wall of the cap plate, the second opening having a second diameter smaller than the first diameter; and a first guide portion between the first opening and the second opening. The rechargeable battery also includes a sealing cap sealing the electrolyte injection opening, the sealing cap having a sealing member engaging the inner wall of the first opening; and a fixing member coupled to the sealing member and engaging the inner wall of the second opening, wherein a portion of the sealing member is spaced from the inner wall of the first opening.

In one embodiment, a central longitudinal axis of the first opening extends in a direction substantially parallel to but is not collinear with a central longitudinal axis of the sealing cap.

BRIEF DESCRIPTION OF ELEMENTS IN DRAWINGS

| | |
|---|---|
| 10: electrode assembly | 11: positive electrode |
| 11a, 13a: coating region | 11b, 13b: uncoated region |
| 12: separator | 13: negative electrode |
| 20: case | 30: cap plate |
| 31: terminal hole | 311: positive electrode terminal hole |
| 312: negative electrode terminal hole | 313: positive electrode terminal support member |
| 314: negative terminal support member | 32: vent hole |
| 33: electrolyte injection opening | 34, 234, 334: sealing cap |

-continued

| | |
|---|---|
| 40: electrode terminal | 41: positive electrode terminal |
| 42: negative electrode terminal | 45: gasket |
| 45a: lower gasket | 45b: upper gasket |
| 46: a washer | 47: nut |
| 61: large diameter opening | 611: bottom |
| 62: small diameter opening | 63: first guide member |
| 71, 271, 371: sealing member | 72, 272, 372: fixing member |
| 73, 273, 373: second guide member | C, CC: gap |
| C1: center of fixing member | C2: center of small diameter opening |
| CP: contact part | D1, D2: first and second diameter |
| L1, L2: first and second distance | W: weld |

DETAILED DESCRIPTION

Embodiments of the present invention will be described more fully hereinafter with reference to the accompanying drawings. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
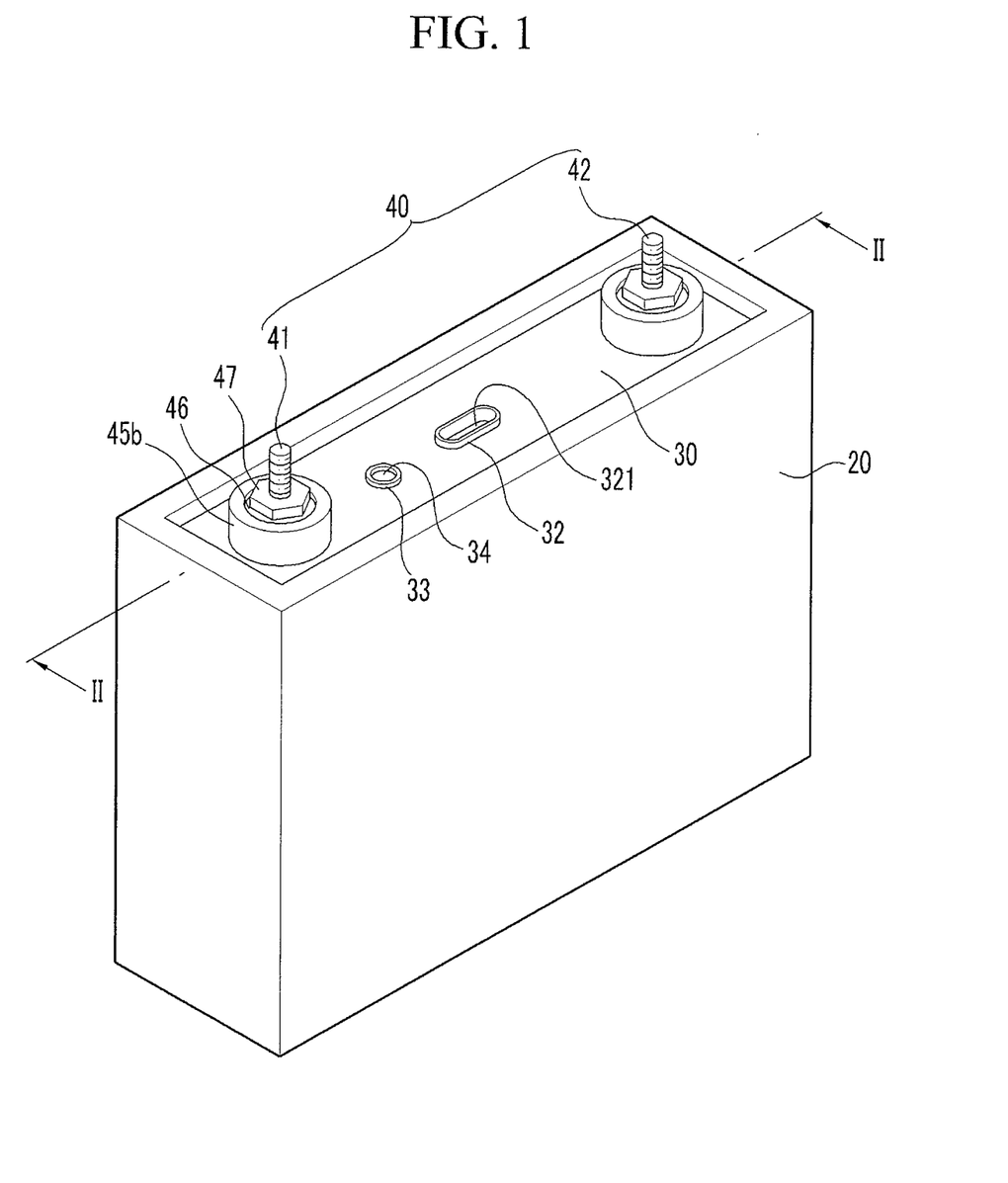
FIG. 1 is a perspective view of a rechargeable battery according to an exemplary embodiment of the present invention.
Figure 2:
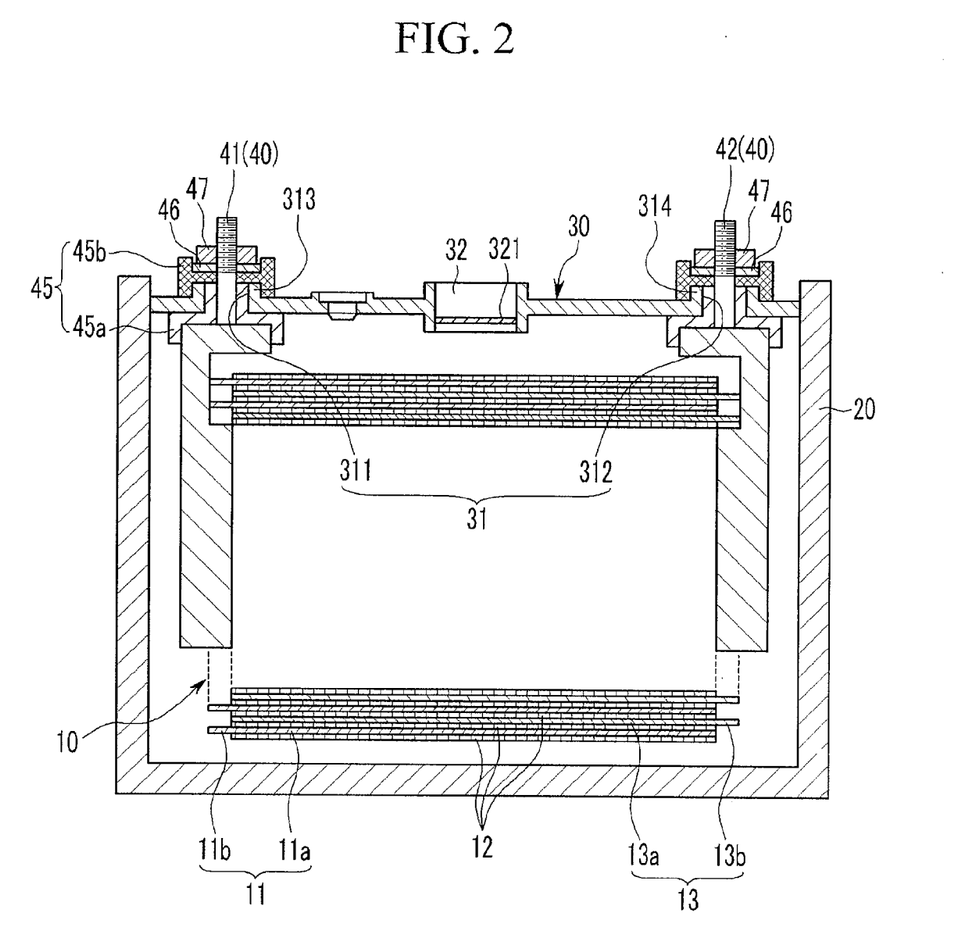
FIG. 2 is a cross-sectional view of FIG. 1 taken along the line II-II.

FIG. 1 is a perspective view of a rechargeable battery according to an exemplary embodiment of the present invention, and FIG. 2 is a cross-sectional view of FIG. 1 taken along the line II-II. Referring to FIG. 1 and FIG. 2, the rechargeable battery according to an exemplary embodiment includes an electrode assembly 10, a case 20, and a cap plate 30, thereby forming a unit battery.

The electrode assembly 10 includes a positive electrode 11, a separator 12, and a negative electrode 13. The electrode assembly 10 is formed by spiral-winding the positive electrode 11, the negative electrode 13, and the separator 12 disposed therebetween. The separator 12 is an insulator.

The positive electrode 11 and the negative electrode 13 are each a thin plate of metal foil, and they form a current collector. The positive electrode 11 and the negative electrode 13 are divided into coated regions 11a and 13a and uncoated regions 11b and 13b according to whether they are coated with an active material or not. The coated regions 11a and 13a are coated with an active material, and the uncoated regions 11b and 13b are not coated with an active material.

In a high power battery, the uncoated regions 11b and 13b are formed at one end of the positive electrode 11 and the negative electrode 13, respectively, and are formed facing opposite directions. The positive electrode 11, the separator 12, and the negative electrode 13 form the electrode assembly 100 in a shape of a jelly-roll by being stacked and spirally-wound.

The rechargeable battery includes electrode terminals 40 connected to the positive electrode 11 and the negative electrode 13. For example, the rechargeable battery includes a positive electrode terminal 41 and a negative electrode terminal 42 that externally protrude through the cap plate 30.

In the electrode assembly 10, the positive electrode terminal 41 is electrically connected to the uncoated region 11b of the positive electrode 11, and the negative electrode terminal 42 is electrically connected to the uncoated region 13b of the negative electrode 13.

The case 20 has one open side and internally receives the electrode assembly 10 and an electrolyte solution. The open side of the case 20 enables the electrode terminals 40 connected to the electrode assembly 10 to protrude from the case 20. As an example, the case 20 is formed in a rectangular shape in the present embodiment.

The cap plate 30 is formed to be connected to the open side of the case 20 to close and seal the case 20, to support the electrode terminals 40 connected to the electrode assembly 10 and protruding from the case 20, to have an electrolyte solution injected therethrough, and to discharge gas generated inside the unit battery.

Figure 3:
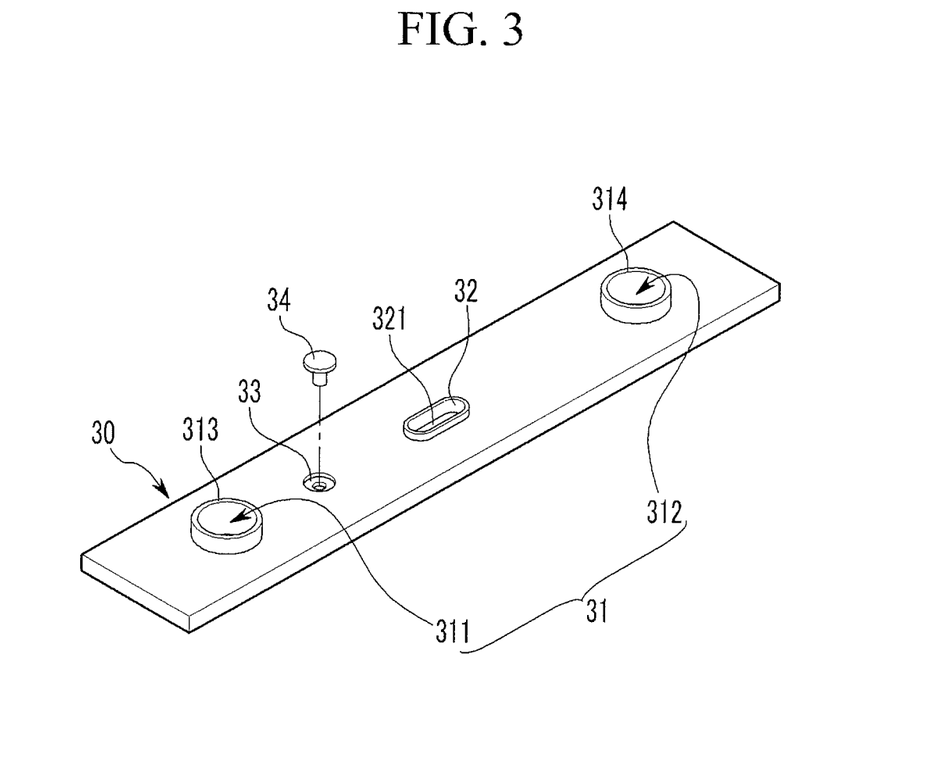
FIG. 3 is a perspective view illustrating a cap plate according to an exemplary embodiment of the present invention.

FIG. 3 is a perspective view illustrating a cap plate. Referring to FIG. 3, the cap plate 30 includes terminal holes 31 for allowing the electrode terminals 40 to protrude therefrom, a vent hole 32 for discharging a gas, and an electrolyte injection opening 33 for injecting an electrolyte solution.

The terminal holes 31 includes a positive electrode terminal hole 311 and a negative electrode terminal hole 312 corresponding to the electrode terminals 40, that is, the positive electrode terminal 41 and the negative electrode terminal 42, respectively. Therefore, the positive electrode terminal 41 and the negative electrode terminal 42 protrude out of the cap plate 40 through the positive electrode terminal hole 311 and the negative electrode terminal hole 312, respectively.

A positive electrode terminal support member 313 and a negative electrode terminal support member 314 are formed at circumferences of the terminal holes 31, that is, circumferences of the positive electrode terminal hole 311 and the negative electrode terminal hole 312. The positive electrode terminal support member 313 and the negative electrode terminal support member 314 support the positive electrode terminal 41 and the negative electrode terminal 42 that protrude from the positive electrode terminal hole 311 and the negative electrode terminal hole 312, respectively.

Referring again to FIG. 2, a gasket 45 is interposed between the positive electrode terminal 41 and the positive electrode terminal hole 311 and between the negative electrode terminal 42 and the negative electrode terminal hole 312. The gasket 45 insulates the positive electrode terminal 41 and the negative electrode terminal 42 from the cap plate 30.

For convenience, the present embodiment will be described with respect to the positive electrode terminal 41 and the positive electrode terminal hole 311. The gasket 45 includes a lower gasket 45a and an upper gasket 45b. The lower gasket 45a is inserted into the positive electrode terminal hole 311 and the upper gasket 45b is disposed on the cap plate 30.

In one embodiment, the upper gasket 45b is larger than the positive electrode terminal support member 313 and surrounds the outer side of the positive electrode terminal support member 313, thereby preventing the positive electrode terminal 41 from rotating.

A washer 46 is disposed on top of the upper gasket 45b, and a nut 47 assembled to a screw member of the positive electrode terminal 41 pushes the washer 46 down. The upper gasket 45b prevents the washer 46 and the nut 47 from contacting the cap plate 30.

Referring again to FIG. 3, the vent hole 32 is formed at about the center of the cap plate 30 for discharging gas generated inside a space formed by the case 20 and the cap plate 30.

A vent plate 321 is installed in the vent hole 32 to seal the vent hole. The vent plate 321 is thinner than the cap plate 30. Under normal conditions, the vent plate 321 keeps the vent hole 32 closed. When an internal pressure of the case increases due to generated gas, the vent plate 321 ruptures and opens the vent hole 32.

The vent plate 321 is formed to open the vent hole 32 promptly when the internal pressure increases and to have the vent hole 32 open widely so as not to disturb discharge of gas.

Meanwhile, the electrolyte injection opening 33 enables injecting of the electrolyte solution into the case 20 sealed by the cap plate 30. The electrolyte injection opening 33 is sealed with a sealing cap 34 after injecting the electrolyte solution.

Figure 4:
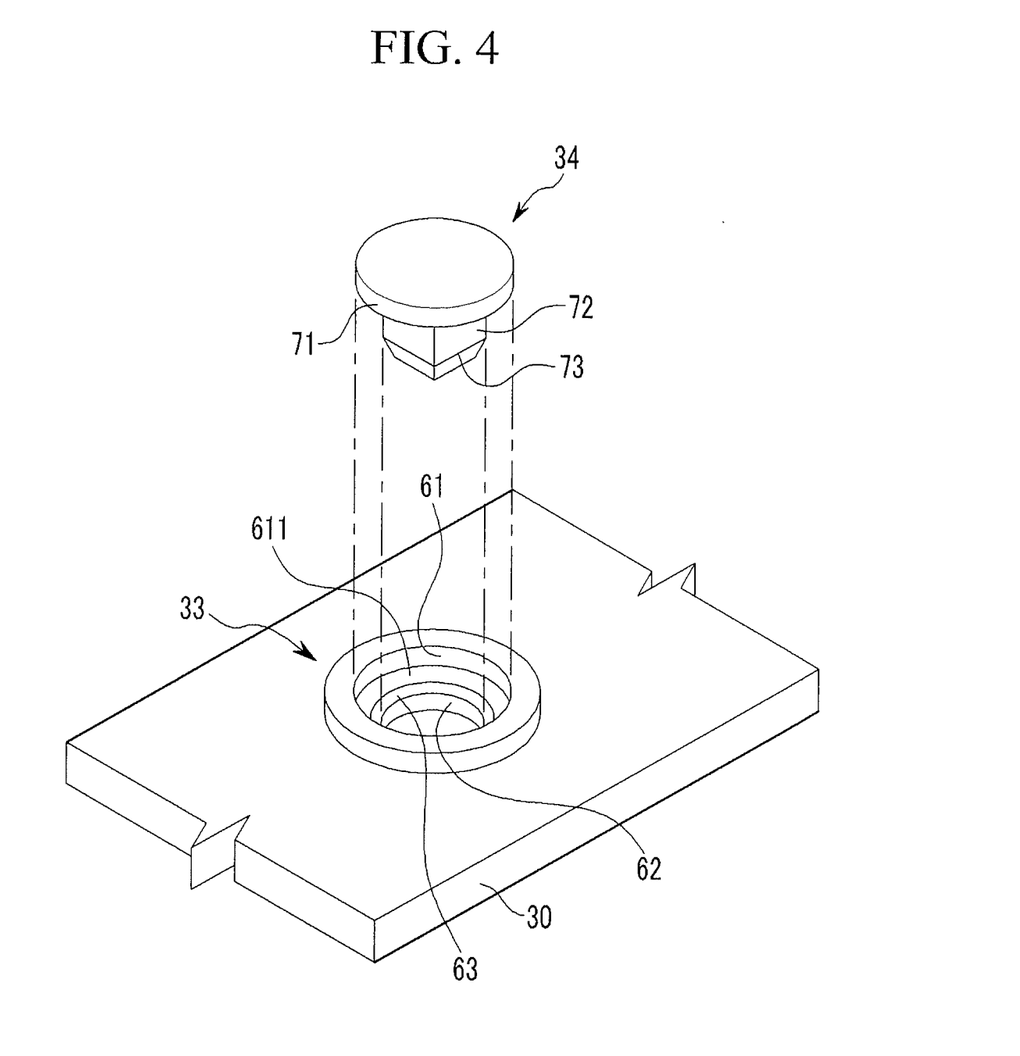
FIG. 4 is an exploded perspective view of a sealing cap and an electrolyte injection opening according to a first exemplary embodiment of the present invention.
Figure 5:
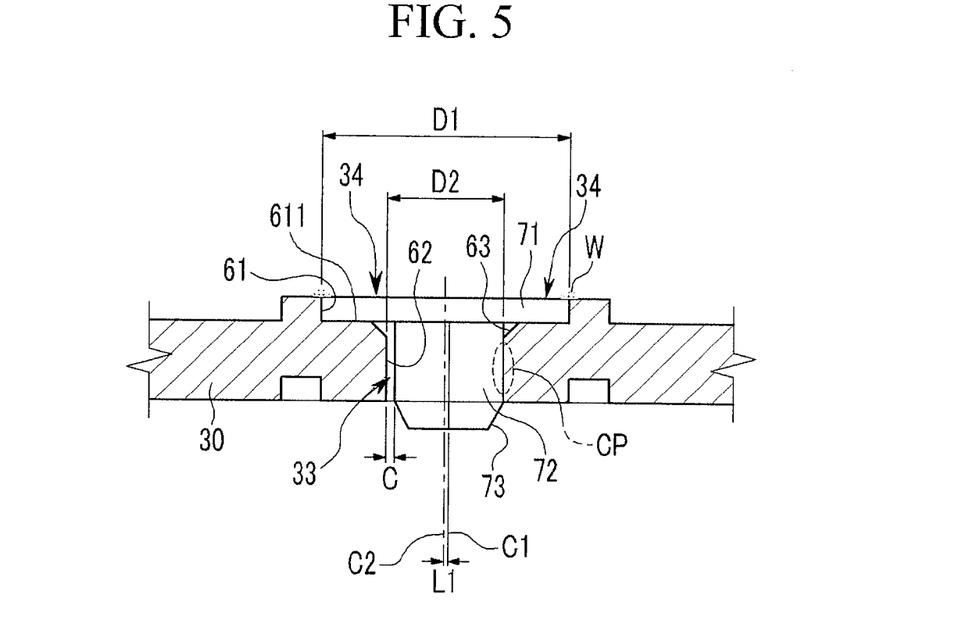
FIG. 5 is a cross-sectional view of an electrolyte injection opening sealed with a sealing cap according to the first exemplary embodiment of the present invention.

FIG. 4 is an exploded perspective view of the sealing cap and the electrolyte injection opening according to a first exemplary embodiment of the present invention, and FIG. 5 is a cross-sectional view of the electrolyte injection opening sealed with the sealing cap according to the first exemplary embodiment of the present invention.

With reference to FIG. 4 and FIG. 5, the electrolyte injection opening 33 will be described. The electrolyte injection opening 33 includes a large diameter opening 61 (i.e., a first opening) and a small diameter opening 62 (i.e., a second opening) that form a stepped structure.

The large diameter opening 61 is defined by an inner wall of the cap plate 30 and has a first diameter D1. In one embodiment, the large diameter opening 61 may be formed to externally protrude from the outer surface of the cap plate 30 through a pressing process. Therefore, the large diameter opening 61 having the first diameter D1 defines a bottom surface 611 that is the sealing area of the electrolyte injection opening 33.

The small diameter opening 62 is also defined by an inner wall of the cap plate 30 with a second diameter D2 that is smaller than the first diameter D1 of the large diameter opening 61. The small diameter opening 62 is connected to the large diameter opening 61 through a first guide member 63. The first guide member 63 connecting the large diameter opening 61 and the small diameter opening 62 is formed to guide insertion of the sealing cap 34, and is formed as an inclined plane or chamfered edge that connects the bottom surface 611 of the large diameter opening 61 to the top of the small diameter opening 62. The inclined plane effectively guides the insertion of the sealing cap 34 into the small diameter opening 62.

The sealing cap 34 includes a sealing member 71 substantially corresponding to the large diameter opening 61 and a fixing member 72 adapted to be inserted into the small diameter opening 62. The sealing member 71 is inserted into the large diameter opening 61. The sealing member 71 includes an inner side that contacts the bottom surface 611 and an outer side that is welded to the edge of the large diameter opening 61, thereby forming a sealing structure between the sealing member 71 and the bottom surface 611.

The fixing member 72 is inserted into the small diameter opening 62. The fixing member 72 includes at least one side or portion contacting the small diameter opening 62 and at least one other side or portion separated from the small diameter opening 62 by a gap C. Overall, the fixing member 72 fixes the sealing cap 34 to the electrolyte injection opening 33.

Since a part formed of a comparatively weak material is deformed at a contact part (CP) of the fixing member 72 and the small diameter opening 62, a tight fitting structure is formed. Therefore, the fixing of the sealing cap 34 becomes further secured.

The gap C formed between the fixing member 72 and the small diameter opening 62 increases insertion tolerance to make insertion of the sealing cap 34 into the electrolyte injection opening 33 easy.

Since the fixing member 72 partially contacts the small diameter opening 62, it is possible to reduce an interference area of the electrolyte injection opening 33 and the sealing cap 34 when the sealing cap 34 is inserted into the electrolyte injection opening 33. Since the interference area is reduced, the insertion of the sealing cap 34 becomes easier, and productivity is improved.

Since the contact of the fixing member 72 and the small diameter opening 62 firmly fixes the fixing member 72 within the small diameter opening 62, the sealing cap 34 may be welded to the large diameter opening 61 through one welding process without performing a pre-welding process. Also, it prevents the sealing cap 34 from separating from the electrolyte injection opening 33 due to purge gas. Accordingly, the welding process becomes simplified, and welding quality and productivity are improved.

This will be described in more detail with reference to FIG. 5. The sealing cap 34 is formed to make one side of the fixing member 72 contact the small diameter opening 62 and to sustain the other side to be separated by a gap (C) from the small diameter opening 62 at the same time.

The electrolyte injection opening 33 includes the large diameter opening 61 and the small diameter opening 62 formed in a cylinder shape. Further, the sealing member 71 of the sealing cap 34 is formed as a circular plate substantially corresponding to the large diameter opening 61, and the fixing member 72 is formed in a polyprism or polyhedral shape to have one side contacting the small diameter opening 62 and other side separated by a gap (C).

Figure 6:
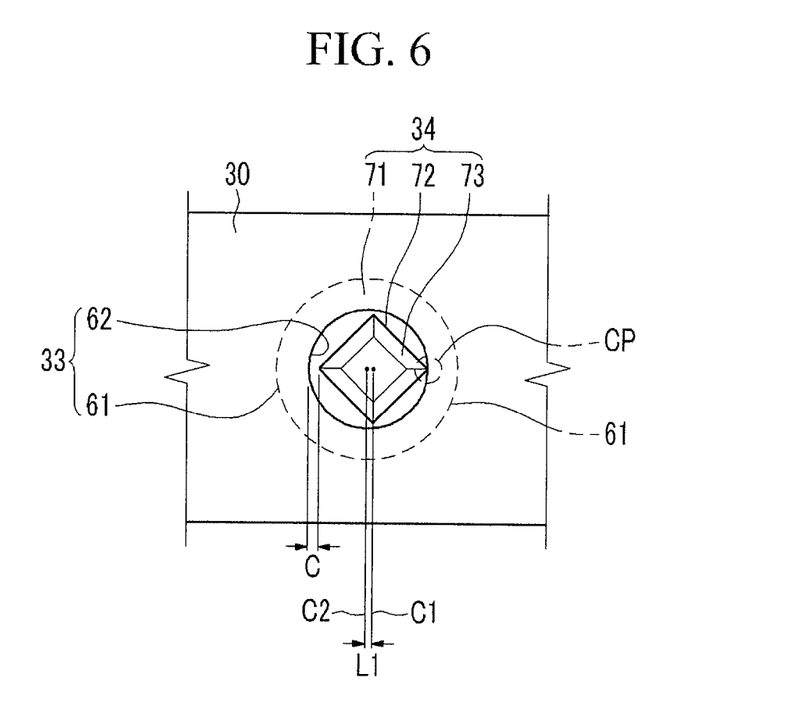
FIG. 6 is a bottom view of the electrolyte injection opening sealed with the sealing cap of FIG. 5.

FIG. 6 is a bottom view of the sealing cap and electrolyte injection opening of FIG. 5. Referring to FIG. 5 and FIG. 6, the fixing member 72 may be formed in a rectangular pillar shape. As shown in FIG. 6, a center C1 of the fixing member 72 and a center C2 of the small diameter opening 62 are separated by a first distance L1. That is, they are not aligned.

As shown, the fixing member 72 forms a contact part (CP) with the small diameter opening 62 at the right side and forms a gap (C) at the left side. By forming the fixing member 72 in the rectangular pillar shape, the fixing member 72 makes line contact with the small diameter opening 62 in a top to bottom direction (i.e., in a direction along an inner wall of the cap plate 30 and forms a gap (C) at the opposite side of the line contact in a diameter direction. Also, the fixing member 72 or the small diameter opening 62 is deformed, thereby forming a tight fitting structure at the contact part (CP). Therefore, the sealing cap 34 is firmly fixed in the electrolyte injection opening 33.

Referring again to FIG. 4, in order to guide insertion of the sealing cap 34 into the electrolyte injection opening 33, an end of the fixing member 72 is formed to have a planar cross-sectional area becoming gradually narrower at the end of the fixing member 72 than a planar cross-sectional area of the other end of the fixing member 72. In other words, an end of the fixing member 72 has a chamfered edge.

For example, the sealing cap 34 further includes a second guide member 73 formed to the fixing member 72. The second guide member 73 may be formed in a truncated polygonal pyramid shape corresponding to the polygonal pillar shape of the fixing member 72. That is, since the fixing member 72 is formed in a rectangular pillar shape in the sealing cap 34 of the first exemplary embodiment, the second guide member 73 is formed in a truncated quadrangular pyramid shape to provide a chamfered edge.

Figure 7:
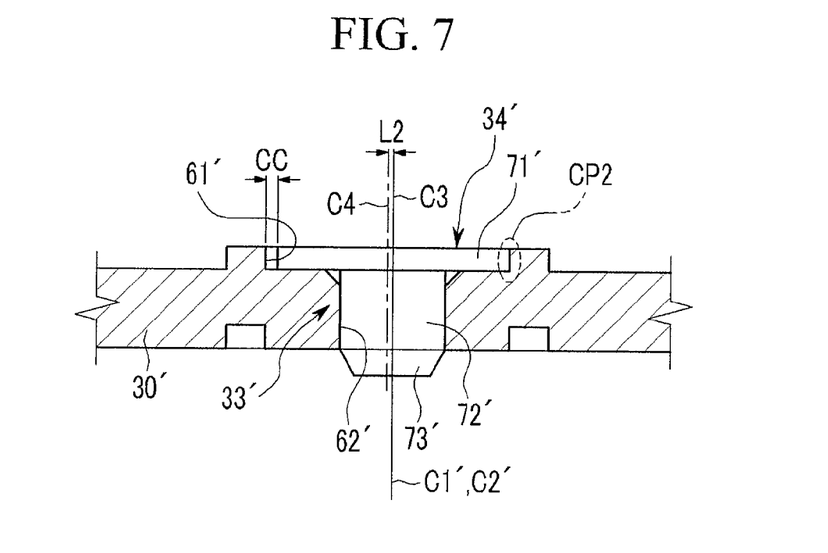
FIG. 7 is a cross-sectional view of an alternate configuration of an electrolyte injection opening sealed with a sealing cap according to another exemplary embodiment of the present invention.
Figure 8:
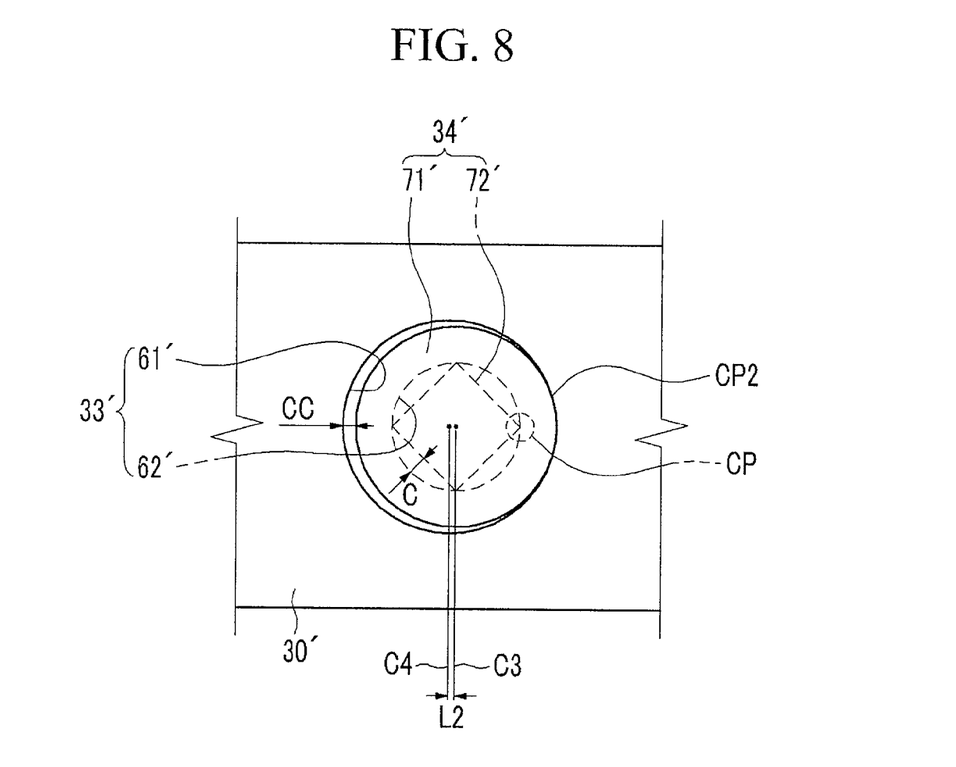
FIG. 8 is a top plan view of the electrolyte injection opening sealed with the sealing cap of FIG. 7.

FIG. 7 is another cross-sectional view of an electrolyte injection opening 33' sealed with a sealing cap 34' according to another exemplary embodiment of the present invention, and FIG. 8 is a top plan view of the electrolyte injection opening 33' sealed with a sealing cap 34' FIG. 7.

Referring to FIG. 7 and FIG. 8, the center C1' of the fixing member 72' is aligned with the center C2' of the small diameter opening 62', and the center C3 of the sealing member 71' is not aligned with the center C4 of the large diameter opening 61'. That is, the center C3 is separated from the center C4 by as much as a second distance L2, unlike the embodiment shown in FIG. 5 and FIG. 6 in which the sealing member has a substantially identical diameter to the large diameter opening 61.

As shown in FIGS. 7 and 8, the sealing member 71' forms a contact part CP2 with the large diameter opening 62' at the right side and forms a gap at the left side. However, the center C1 of the fixing member 72' may be aligned with the center C2 of the small diameter opening 62' even though the center C3 of the sealing member 71' is separated from the center C4 of the large diameter opening 62' by the second distance L2.

Accordingly, the fixing member 72' makes line contact with the small diameter opening 62' in a top-to-bottom direction, makes four line contacts along a circumference direction, and forms a gap (C') between adjacent line contacts. Since the fixing member 72' makes the four line contact parts CP, the sealing cap 34' is firmly fixed at the electrolyte injection opening 33'.

Figure 9:
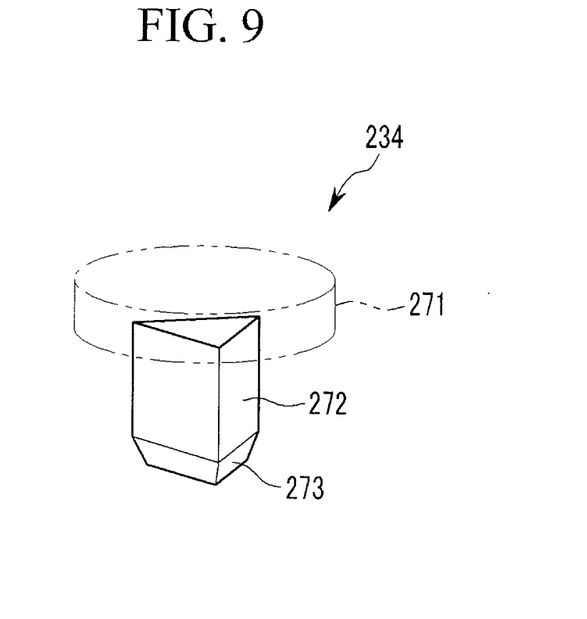
FIG. 9 is a perspective view of a sealing cap according to a second exemplary embodiment of the present invention.
Figure 10:
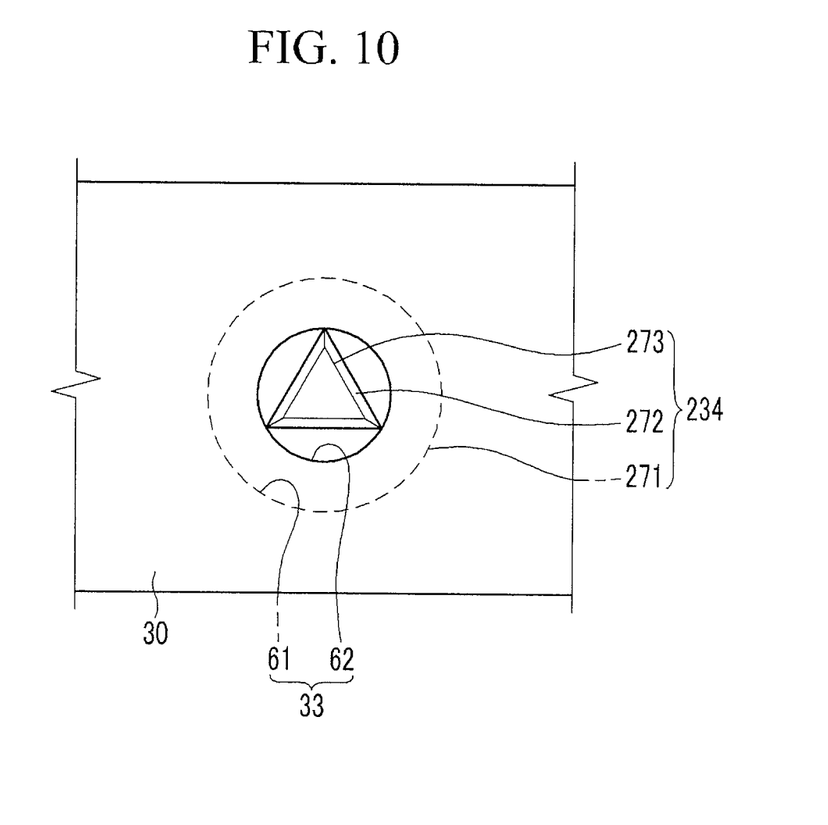
FIG. 10 is a bottom view of an electrolyte injection opening sealed with a sealing cap according to the second exemplary embodiment of the present invention.

FIG. 9 is a perspective view of a sealing cap according to the second exemplary embodiment of the present invention, and FIG. 10 is a bottom view of an electrolyte injection opening sealed with a sealing cap according to the second exemplary embodiment of the present invention.

Referring to FIG. 9 and FIG. 10, a sealing cap 234 of a second exemplary embodiment includes a sealing member 271 formed as a circular plate and a fixing member 272 formed in a triangular pillar shape. Additionally, a second guide member 273 is formed in a truncated triangular pyramid shape (i.e., a chamfered edge) connected to the triangular pillar shape.

The function of the sealing cap 234 according to the second exemplary embodiment is identical to that of the sealing cap 34 according to the first exemplary embodiment. Since the fixing member 272 and the second guide member 273 are formed in the triangular pillar shape and the truncated triangular pyramid shape, respectively, the sealing cap 234 is more easily insertable into the small diameter opening 62 than the fixing member 72 and the second guide member 73 formed in the rectangular pillar shape and the truncated rectangular pyramid shape, respectively, according to the first embodiment.

Figure 11:
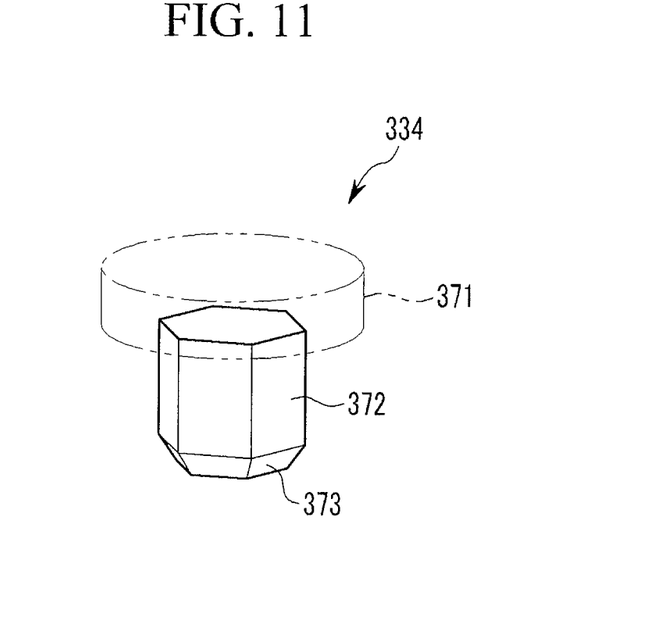
FIG. 11 is a perspective view of a sealing cap according to a third exemplary embodiment of the present invention.
Figure 12:
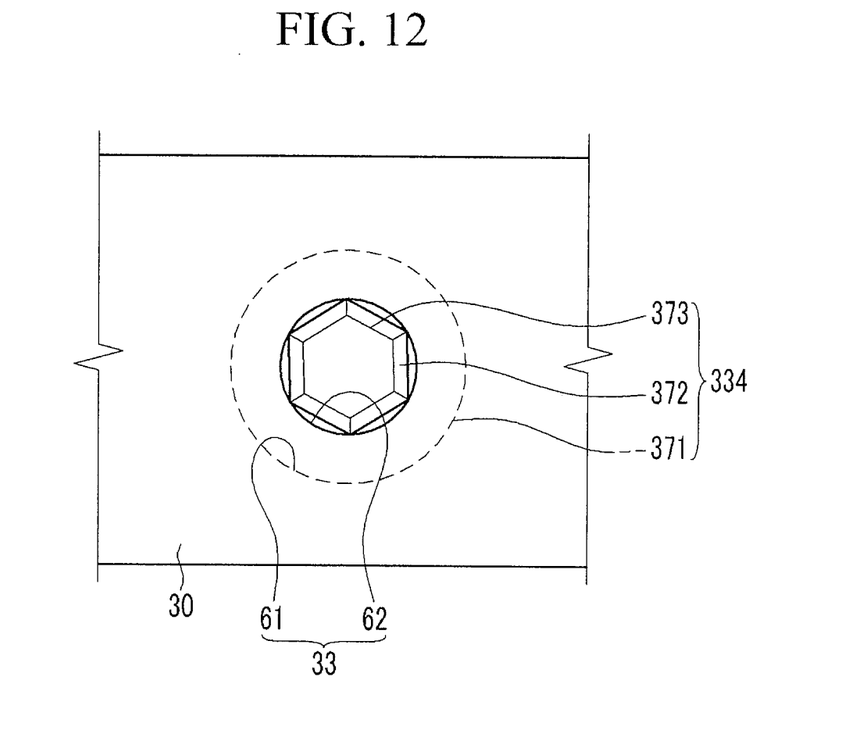
FIG. 12 is a bottom view of an electrolyte injection opening sealed with a sealing cap according to the third exemplary embodiment of the present invention.

FIG. 11 is a perspective view of a sealing cap according to the third exemplary embodiment of the present invention, and FIG. 12 is a bottom view of an electrolyte injection opening sealed with a sealing cap according to the third exemplary embodiment of the present invention.

Referring to FIG. 11 and FIG. 12, a sealing cap 334 according to the third exemplary embodiment includes a sealing member 371 formed as a circular plate and a fixing member 372 formed as a hexagonal pillar. Additionally, a second guide member 373 is formed in a truncated hexagonal pyramid shape (i.e., a chamfered edge) connected to the hexagonal pillar shape.

The function of the sealing cap 334 according to the third exemplary embodiment is identical to the sealing cap 34 according to the first exemplary embodiment. The fixing member 372 and the second guide member 373 are formed in a hexagonal pillar shape and a truncated hexagonal pyramid shape. As such, the fixing member 372 contacts inner walls of the cap plate 30 at six locations to secure the sealing cap 334 in the electrolyte injection opening 33.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly having a positive electrode, a separator, and a negative electrode;
a case housing the electrode assembly;
an electrode terminal electrically connected to the electrode assembly;
a cap plate sealing the case, the cap plate having a terminal hole through which the electrode terminal protrudes and an electrolyte injection opening defined by an inner wall comprising a first inner wall defining a first opening having a first diameter and a second inner wall defining a second opening having a second diameter smaller than the first diameter; and a first guide portion between the first opening and the second opening; and
a sealing cap sealing the electrolyte injection opening, the sealing cap comprising:
a sealing member engaging the first inner wall; and
a fixing member coupled to the sealing member and engaging the second inner wall, the fixing member having side edges extending in a first direction generally towards the electrode assembly and a bottom edge extending in a second direction generally perpendicular to the first direction, wherein at least one of the side edges overlaps with and is entirely spaced from the second inner wall such that a gap extends along an entire height of the second inner wall.

2. The rechargeable battery of claim 1, wherein the first guide portion comprises a chamfered edge connecting the first opening and the second opening to guide insertion of the sealing cap in the electrolyte injection opening.

3. The rechargeable battery of claim 1, wherein the first opening and the second opening are cylindrical,
wherein the sealing member is a circular plate; and
wherein the fixing member has a polyhedronal shape.

4. The rechargeable battery of claim 3, wherein the fixing member has a quadrangular pillar shape, a triangular pillar shape, or a hexagonal pillar shape.

5. The rechargeable battery of claim 1, wherein at least one of the side edges of the fixing member contacts at least a portion of the second inner wall along a length of the respective of at least one of the side edges.

6. The rechargeable battery of claim 1, wherein the bottom edge of the fixing member is chamfered to guide the fixing member into the electrolyte injection opening.

7. The rechargeable battery of claim 1, wherein the fixing member has a polyhedronal shape and wherein the sealing cap further includes a second guide member connected to the fixing member and having a truncated polygonal pyramid shape.

8. The rechargeable battery of claim 7, wherein the second guide member has a truncated quadrangular pyramid shape, a truncated triangular pyramid shape, or a truncated hexagonal pyramid shape.

* * * * *